Jan. 4, 1944. C. H. JENKINS 2,338,333
SCREW TYPE FASTENER
Filed Feb. 17, 1942
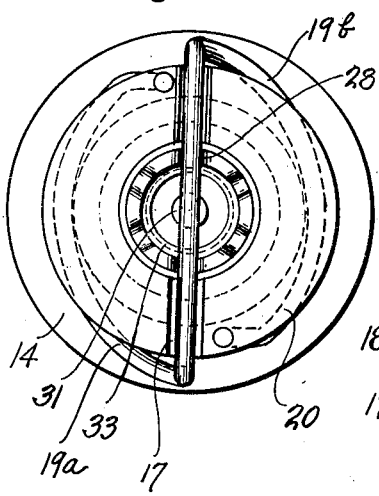
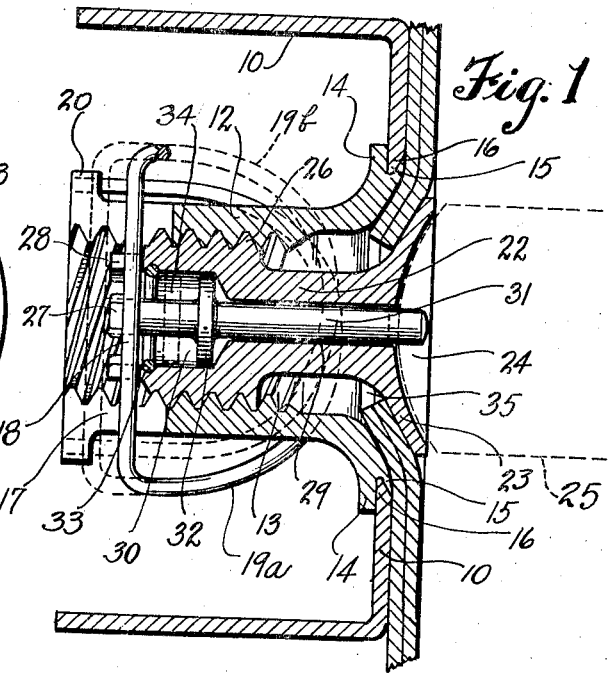
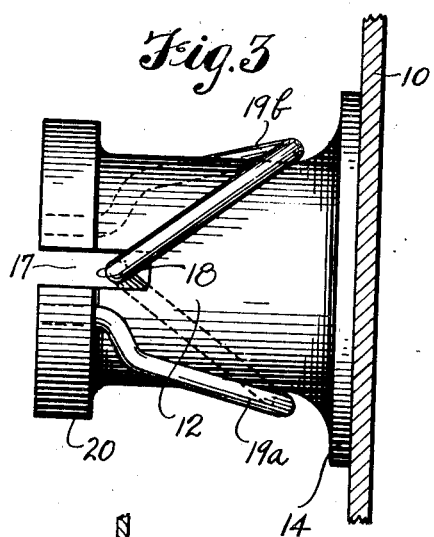
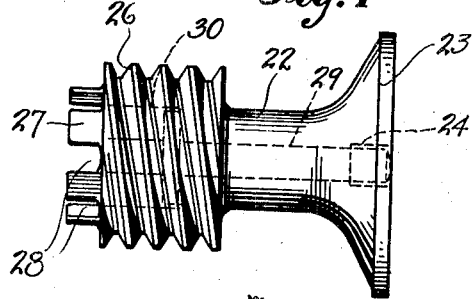
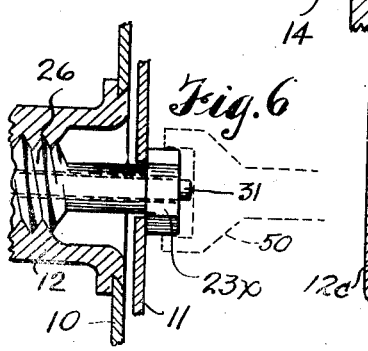
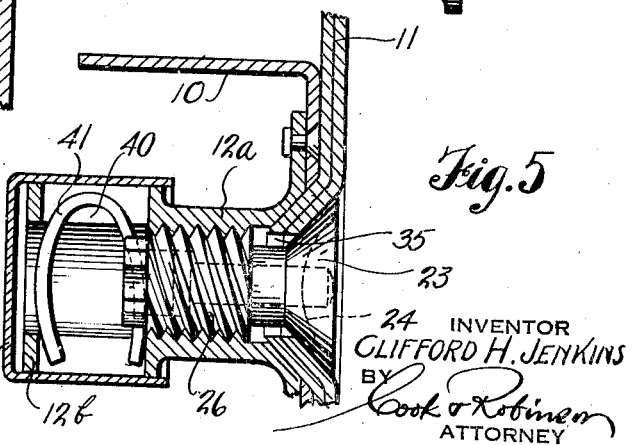
INVENTOR
CLIFFORD H. JENKINS
BY
Cook & Robinson
ATTORNEY Patented Jan. 4, 1944

2,338,333

UNITED STATES PATENT OFFICE 2,338,333

SCREW TYPE FASTENER

Clifford H. Jenkins, Seattle, Wash.

Application February 17, 1942, Serial No. 431,182

4 Claims. (Cl. 151—6)

This invention relates to fasteners, and it has reference more particularly to "screw type" fasteners of a kind especially useful in airplane and airship construction for the securement of the cowl plates, and the like, to the fuselage or ribs of the frame structure; it being understood, however, that the present fastener is by no means restricted or limited to this mentioned use, but may be put to many other uses where a quick release and removal of parts is desired.

It is the principal object of this invention to provide a screw type fastener, for the securement of cowl plates or the like, to supporting members; furthermore, a fastener that may be easily and readily applied, and which includes means as a part thereof for effecting the automatic locking of the screw against loosening after it has been functionally applied.

It is also an object of this invention to provide a screw type fastener of the kind above stated wherein the screw locking member, hereinafter referred to as the screw locking key, is yieldingly mounted and may be readily disengaged from its functional holding connection with the screw, by the application of the screw driving or turning tool to the slot of the screw head.

More specifically stated, the objects of the present invention reside in the provision of a screw type fastener of the character above stated, comprising an internally threaded mounting adapted for fixed attachment to a frame member or support, and formed across its inner end with a diametrically directed slot or channel containing an inwardly yieldably locking key. Also, the fastener comprises a screw having a threaded shank applicable to the above mentioned internally threaded mounting, and formed at its inner end with one or more cross channels adapted to seat the locking key therein for the purpose of holding the screw against release or turning after being applied. Furthermore, the screw shank is axially bored, and slidably contains a key releasing pin therein with a part of the pin so exposed at the head of the screw that, upon application of a screw driving tool to the head, the pin will be shifted inwardly in the shank to a position within the cross channeled end that the locking key will be held disengaged from and unseated from the cross channels until the screw has been tightened into place and the driving tool removed.

Still further objects of the invention reside in the details of construction of the various parts embodied in the fastener, and in their combination and mode of operation as will hereinafter be fully described.

In accomplishing these and other objects of the invention, I have provided the improved details of construction, the preferred forms of which are illustrated in the accompanying drawing, wherein—

Fig. 1 is a sectional detail taken in the axial plane of an assembled fastener embodied by the present invention.

Fig. 2 is an inner end view of the fastener.

Fig. 3 is a side view of that part of the fastener referred to as the mounting.

Fig. 4 is a side view of that part of the fastener referred to as the screw.

Fig. 5 is a sectional detail, similar to that of Fig. 1, illustrating a screw locking key of an alternative form.

Fig. 6 is a detail illustrating an alternative form of screw head.

Referring more in detail to the drawing—

First it will be explained that Fig. 1 of the drawing shows the fastener approximately twice the size of the fastener as now used in airplane construction for the securement of cowl plates. However, it is not intended that the fastener be confined or limited to any particular proportions or dimensions, as it may be desirable or practical to make such fasteners larger or smaller, dependent upon the use or type of work to which they are to be applied.

In Figs. 1 and 3, 10 designates a fuselage frame member, or support to which a plate, such as the cowl plate designated by reference numeral 11, is to be applied and secured. Fixed permanently to the rib, or support 10, is the mounting 12 of the present fastener. This mounting is here shown as being of tubular form, and is internally threaded, as at 13. At one end, here referred to as the outer end for convenience in explanation, the body of the tubular mounting is outwardly flared to form an annular shoulder 14 which seats flatly against the inner face of the rib or support 10 about an opening formed in the support and within which this shouldered end of the mounting is securely and permanently locked. Preferably, the securement is effected by outwardly reaming a flange 15, formed at the inner end of the mounting over the peripheral portion 16 of the opening. It is to be understood, however, that other methods of fixing the mounting in place might be employed.

At its inner end, that being the end away from the rib 10, the mounting 12 is formed with a diametrically directed slot 17. This is of substantial depth and contains therein the screw locking key 18, diametrically of the mounting. The key 18 in this instance comprises a straight, medial portion of a spring wire clip, the opposite end portions of which are curved so as to form loops 19a and 19b, substantially of semi-circular form, which respectively lie across opposite sides of the mounting 12 and have ends fixed in an outwardly directed annular flange 20 formed about the inner end portion of the mounting 12. The loops thus formed in the spring wire mounting for the screw locking key 18, operate to yieldingly urge the key toward the bottom of the transverse slot 17 for a purpose presently to be explained.

The screw portion of the fastener comprises the screw shank 22 formed at its outer end with a conical head portion 23 having a diametrically directed slot 24 designed to receive the end portion of a screw driving tool. In Fig. 1, a portion of the screw driving tool is designated in dotted lines at 25. The inner end portion of the screw shank 22 is threaded, as shown at 26, and this portion terminates in an extension 27, somewhat reduced in diameter as shown best in Fig. 4. This extension portion is formed with a plurality of diametrically formed grooves or channels 28 designed to seat the locking key therein.

The screw shank 22 is also formed from end to end with an axial bore 29, and at the inner end of the screw, this bore is somewhat enlarged, as shown at 30. Slidably fitted within the bore 29 is the key releasing pin 31. This pin is formed with an encircling shoulder 32 contained within the enlarged portion 30 of the bore. Also, there is an annular locking ring 33 set within an anular channel 34 in the enlargement 30 of the bore, and this ring, together with the base wall of the enlargement, limits the endwise movement of the key release pin. The length of the pin 30, as used in the fastener of Fig. 1, is such that when the outer end thereof is even with the base of the transverse slot 24 in the screw head, the flat inner end will be even with, or slightly beyond the plane of the inner end surface of the extension portion 27. The diameter of the pin 31 is such that when in this position, it prevents the locking key from seating in any of the cross channels 28.

Assuming that the screw 22 has been extended through an opening provided to receive it in the cowl plate 11, such an opening being indicated at 35 in Fig. 1, and that the plate has been placed properly in position with reference to the support 10 to which it is to be attached, the screw 22 may then be threaded inwardly into the internally threaded mounting 12, in the usual manner by applying a screw driving tool to the cross slot 24 of the screw head 23.

It will be understood, however, that when a screw driving tool 25 is applied to the cross slot in the screw head, it will engage with the exposed outer end portion of the pin 31 and the latter will be moved inwardly to the dotted line position in which it is shown in Fig. 1. By this movement of the pin 31, the inner end portion thereof will be shifted to such position that it will then unseat or prevent the cross key 18 seating within any of the cross channels 28 and thus, the screw may be tightened into place. However, as soon as the driving tool 25 is withdrawn from the screw head slot, the function of the spring loops 19a and 19b is to draw the cross key 18 toward the base of the cross slot 17 and against the cross channeled end of the screw shank so that it will automatically seat itself in one of the cross channels 28 as a means of positively locking the screw against release turning.

In the alternative form of fastener device of Fig. 5, the mounting, which is designated by reference numeral 12a, is formed with an inner end enlargement 12b, in which there is a diametric slot 40. In this slot, a U-shaped spring member 41 is disposed in such manner that one leg engages against one edge of the slot and causes the other leg to be pressed toward and engaged within the cross channels 28 of the screw shank in the same manner and for the same purpose as the locking key 18 is used in the fastener of Fig. 1. The release of the leg of this locking key from the screw shank is effected, as previously explained, by the depression of the release pin contained in the screw; it being understood that the construction and arrangement of parts in this modified form, except as above stated, is substantially the same as in the fastener illustrated in Fig. 1. To retain the spring against endwise displacement, the enlargement 12b is fitted with a cap or sheath 12c.

In Fig. 6, I have shown a screw as equipped with a wrench head instead of the usual slotted head. In such case, the pin 31 normally extends beyond the screw head 23x and will be depressed by the application of the head of a socket wrench to the screw head; such a wrench being designated by reference numeral 50.

In view of the locking feature provided in this screw type fastener by the cross pin 18 or U-member 41, it is possible to use screw threads of greater pitch than are ordinarily used, and thus provide for faster application or removal. In the fastener of Figs. 1 and 4, I have shown a double screw thread, while that of Fig. 5 shows a screw of still greater pitch. However, it is well to explain that any pitch found to be practical can be employed, and this has no particular bearing on the invention.

I claim:

1. In a screw fastener of the character described, a mounting having an internally threaded channel, a screw having its shank threaded for application to the threaded channel of said mounting, and formed across its inner end with one or more diametric slots, a screw locking key fixed in the said mounting and extended across the threaded channel and yieldingly movable in the axial direction of the channel, and adapted to automatically seat itself in one of the slots of the screw shank incident to the tightening of the screw shank in the mounting, and a key releasing pin mounted coaxially in the screw and retained therein for limited endwise movement and having an outer end portion exposed at the head end of the screw to be engaged by a screw driving tool for inward movement of the pin to cause its inner end portion to engage and unseat the locking key from the shank slot, or to hold it disengaged from the shank while the screw is being applied or removed.

2. In a fastener of the character described, a mounting member having an internally threaded channel, and formed with a key slot directed diametrically through the channel and extending in the axial direction thereof, a screw having a driving head and having its shank threaded for application to the threaded channel of said mounting, a screw locking key contained in the key slot of said mounting and extending across the channel thereof; said screw shank having one or more diametric slots across the inner end portion thereof for seating the said key to lock the shank against turning after it has been applied, means yieldingly urging the key toward its screw locking position, and a key releasing pin mounted by and contained coaxially in the screw shank for limited movement and having a part thereof exposed at the head portion of the screw for engagement by the screw driving tool whereby the pin may be moved inwardly to engage the locking key to retain it free of the slots in the shank while the screw is being rotated.

3. A fastener as in claim 2 wherein the driving head of the screw is formed with a cross slot to receive the end portion of a driving tool and wherein the outer end portion of said key releasing pin extends into said slot and is adapted to be engaged by the end portion of the screw driving tool when it is applied to the said cross slot to move the pin inwardly to unseat the screw locking key from a slot of the shank or to retain it disengaged from the screw while it is being applied or removed; said pin being limited in its movement in the screw to prevent the pin extending above the face of the screw head.

4. A fastener as recited in claim 2 wherein the said means for yieldingly urging the key toward its screw locking position comprises spring wire loops continuing from the ends of the key and fixed at their ends under tension in the mounting.

CLIFFORD H. JENKINS.